(12) United States Patent
Iwami

(10) Patent No.: US 6,470,076 B1
(45) Date of Patent: Oct. 22, 2002

(54) PORTABLE TELEPHONE WITH VOICE-PROMPTED MENU SCREENS

(75) Inventor: Akiko Iwami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/155,114

(22) PCT Filed: Mar. 18, 1997

(86) PCT No.: PCT/JP97/00862

§ 371 (c)(1),
(2), (4) Date: Sep. 21, 1998

(87) PCT Pub. No.: WO98/42110

PCT Pub. Date: Sep. 24, 1998

(51) Int. Cl.[7] ............................. H04M 1/64; H04M 1/00
(52) U.S. Cl. ...................... 379/67.1; 379/72; 379/88.27; 455/566
(58) Field of Search ........................... 379/88.27, 88.28, 379/67.1, 72, 76, 387.02; 455/550, 575, 566

(56) References Cited

U.S. PATENT DOCUMENTS 5,465,086 A * 11/1995 Glesson et al. ............ 379/67.1
5,481,595 A * 1/1996 Ohashi et al. ........... 379/88.27

FOREIGN PATENT DOCUMENTS

| CA | 2012199 A | * 9/1991 | ............ H04M/1/00 |
|---|---|---|---|
| JP | 2161697 | 6/1990 | ............ G11C/27/00 |
| JP | 2252055 | 10/1990 | ............ G06F/15/21 |
| JP | 4344917 | 12/1992 | ............ G06F/3/023 |
| JP | 553705 | 3/1993 | ............. G06F/3/02 |
| JP | 574043 | 3/1993 | ............ G11B/20/00 |
| JP | 8272572 | 10/1996 | ............. G06F/3/14 |

* cited by examiner

Primary Examiner—Fan Tsang
Assistant Examiner—Ovidio Escalante
(74) Attorney, Agent, or Firm—Rothwell, Figg, Ernst & Manbeck

(57) ABSTRACT

The portable telephone of the present invention provides an environment in which recording/playing back of user's voice is made possible at each of the menu screens. Operations of a portable telephone can be smoothly performed by adding voice information to each menu screen.

There are provided a memory device (4) for storing voice data, a microphone (1) and a speaker (7) for inputting/outputting voice, an encoder (2) and a decoder (6) for performing digital/analog conversion of voice, and a key operating portion (9) for achieving recording or playing back of voice by a first key operation and determining an input operation and executing recording or playing back of voice by a second key operation. Not only character information displayed on a display, but also guides or information by voice messages, can be obtained and, therefore, erroneous operations made by the user can be eliminated.

5 Claims, 7 Drawing Sheets

PORTABLE TELEPHONE WITH VOICE-PROMPTED MENU SCREENS

TECHNICAL FIELD

The present invention relates to a portable telephone having a voice recording and playing back function.

BACKGROUND ART

Referring to conventional voice recording functions of portable telephones, in many cases, there have been recording methods of only narrow scope. For example, some of them are equipped with only a function for registering telephone numbers by voice. Otherwise, as disclosed in Japanese Patent Laid-open No. Hei 8-32670, one may register names by voice that have been previously registered. Still others are such that they only take memos by voice. Thus, users of portable telephones have been unable to select other methods than those mentioned above.

Japanese Patent Laid-open No. Hei 4-314242 discloses a cordless telephone giving, by voice, notices about the running down of its battery, alarms about its talking range, guides to its various functions, and so on. On the other hand, portable telephones are tending to become more and more multi-functional and, keeping pace with this, users are increasingly operating the portable telephone only according to displays made on the screen.

However, as the operations become complicated, there arises the problem that the user makes similar mistakes again and again before reaching a wanted menu screen because of the small amount of information available from the display (indication) on the screen.

The present invention was made in order to solve the above mentioned problem. Accordingly, it is an object of the invention to provide a portable telephone in which it is made possible to make voice recording of all the menu/memory screens. Further, it is possible, when a menu screen is accessed again, to play back the voice recorded thereat.

It is another object of the invention to provide a portable telephone in which it is possible to instantly reach a desired menu screen only by means of played back voice sounds.

DISCLOSURE OF INVENTION

The portable telephone according to the invention includes a microphone (1) for receiving a voice input and a speaker (7) for delivering a voice output. The portable telephone has the function of recording and playing back the sound input from the microphone (1) at each of the menu screens. A control portion (8) of the portable telephone comprises an encoder (2) for converting an input signal from the microphone (1) into a digital signal, a memory device (4) for storing converted voice data, a decoder (6) for taking out data from the memory device, converting it into an analog signal, and playing back and outputting the analog signal from the speaker (7). A key operating portion (9) of the portable telephone is adapted to achieve recording or playing back of voice by a first key operation and to determine an input operation and execute recording or playing back of voice by a second key operation. Accordingly, not only character information displayed on the display, but also guides or information by voice messages, can be obtained from the portable telephone. Further, the user can record any message at will as a voice message, and therefore the portable telephone can not only be used for telephoning but also has a potential for various other applications.

BEST MODE FOR CARRYING OUT THE INVENTION

An embodiment 1 of the invention will be described with reference to FIG. 1.

Figure 1:
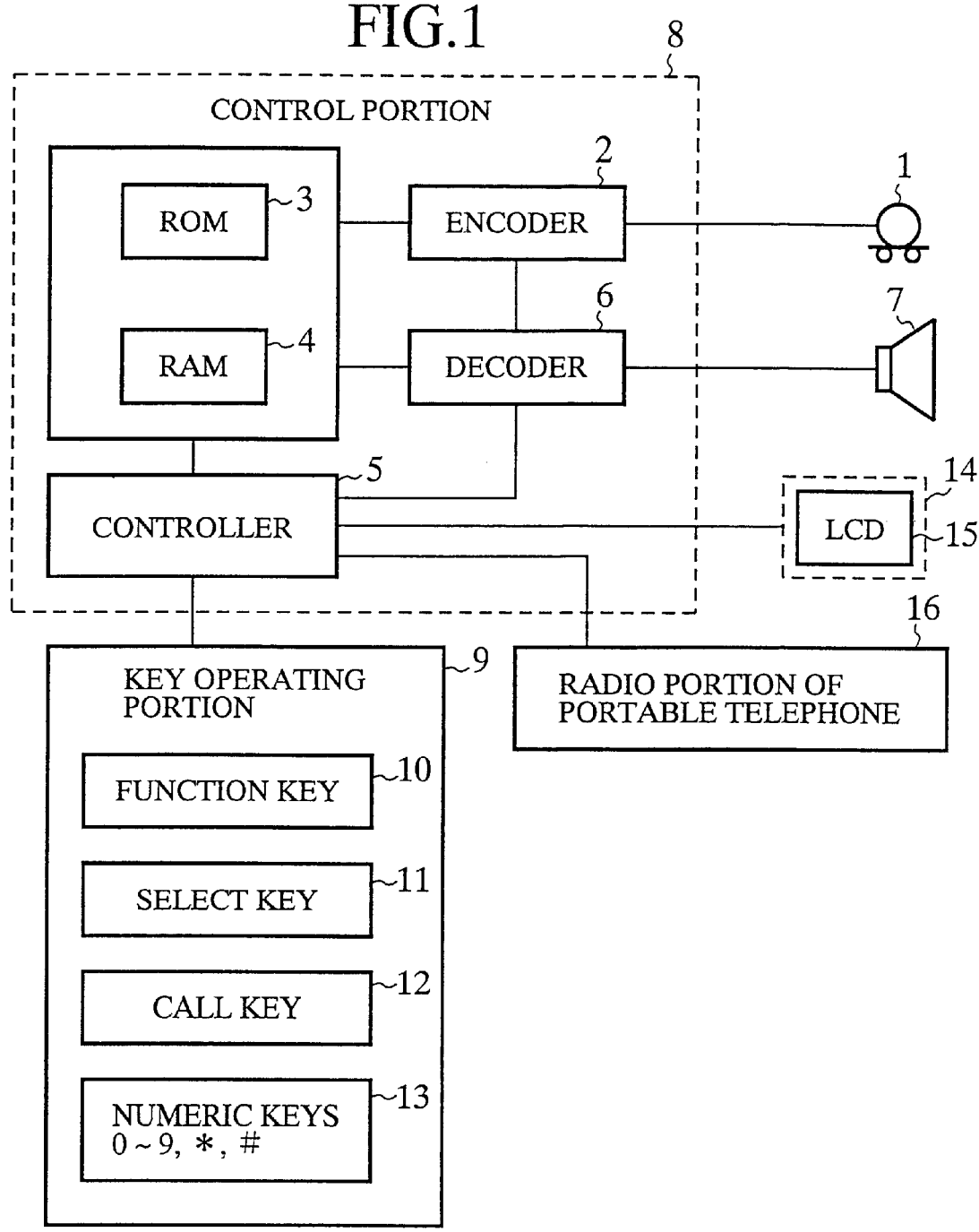
FIG. 1 is a block diagram showing a structure of a portable telephone according to the invention.

A control portion 8 of a portable telephone shown in FIG. 1 comprises a microphone 1 for receiving a voice input, an encoder 2 for converting the input analog signal into a digital signal, a memory device (ROM) 3 storing voice data in advance, a memory device (RAM) 4 for storing new voice data, a controller 5 for controlling these memory devices 3 and 4, a decoder 6 for taking out data from the memory devices 3 and 4 and converting the data into voice data to be played back and output from the speaker 7. A key operating portion 9 comprises a function key 10, a select key 11, a call key 12, and numeric keys 13 (0–9, *, #). A display section 14 is formed from an LCD 15 for displaying characters. Reference numeral 16 denotes a radio portion of the portable telephone.

Figure 2:
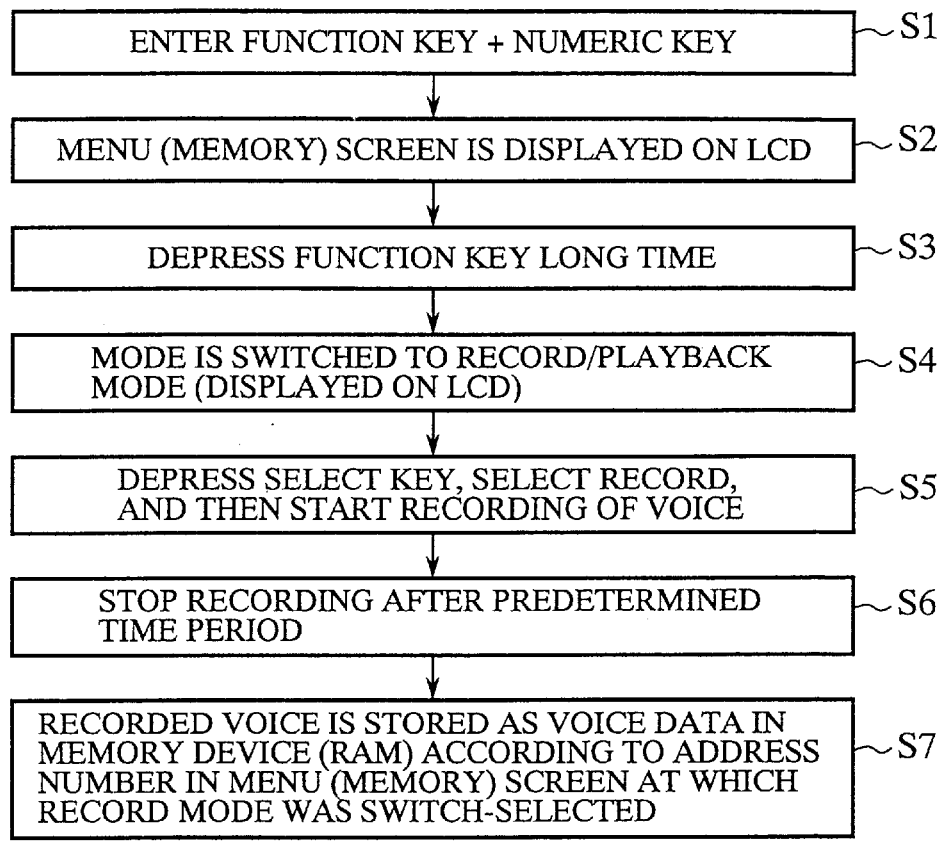
FIG. 2 is a flowchart showing a voice recording operation in an embodiment 1.

An operating method for recording voice will be described with reference to FIG. 2. First, the function key 10 and the numeric key 13 are used to access a relevant menu screen (step S1). The menu screen is displayed on the LCD 15 (step S2). When the screen at which voice inputting is required has appeared, the function key is depressed for a long time (step S3) by which means the mode is switched to a voice record/playback mode (step S4). The user pushes down the numeric key 13 and the select key 11 to select the recording mode and then, according to the user's needs, records a message at this screen (step S5). The voice is passed through the microphone 1 and the encoder 2 and stored, as voice data, in the memory device 4 (steps S6 and S7).

Figure 3:
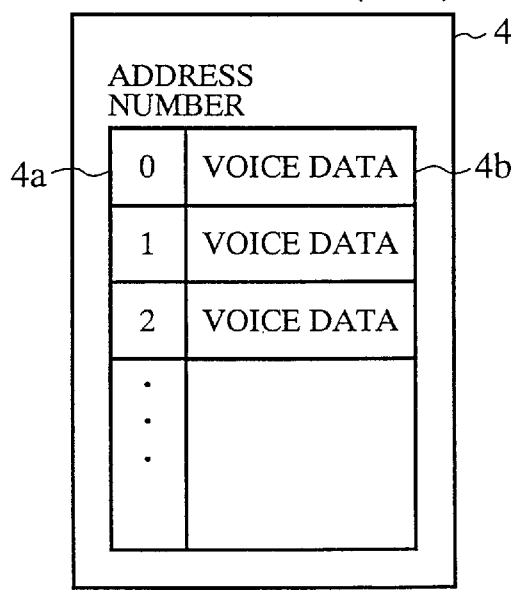
FIG. 3 is a block diagram showing the storage area of a memory device in the embodiment 1.

The structure of the above mentioned memory device 4 is shown in FIG. 3. In the memory device (RAM) 4, there are stored address numbers 4*a* (0, 1, 2, . . . ) corresponding to each of the menu (memory) screens and voice data 4*b* corresponding to each of the address numbers. For example, address numbers 4*a* are respectively assigned to the SMS (short message services) edit screens and voice data 4*b* corresponding to these numbers are stored in the corresponding storage areas.

Figure 4:
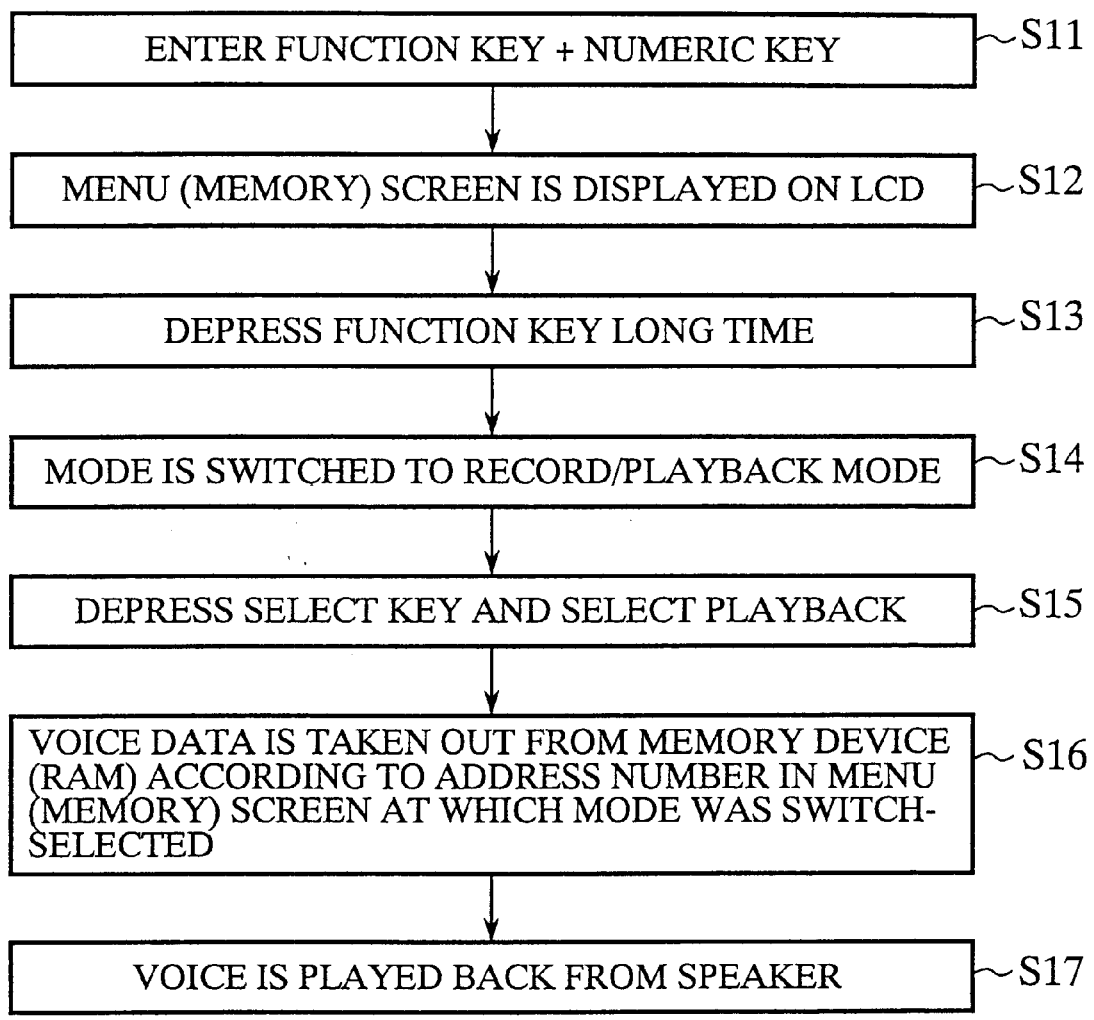
FIG. 4 is a flowchart showing a voice playing back operation in the embodiment 1.

Now, playback of stored voice will be described with reference to FIG. 4. When the same menu (memory) screen has been accessed by using the same method as in the recording of the voice (step S11), the menu (memory) screen is displayed on the LCD 15 (step S12). By pushing down the function key 10 for a long time at this screen (step S13), the mode is switched to the voice record/playback mode (step S14). The user selects "playback" of "playback/record" by depressing the select key 11 (step S15). After the selection has been made, the voice data is taken out from the memory device (RAM) 4 in accordance with the address number in the menu screen at which the mode was switched to the playback mode (step S16). The voice data is converted into an analog signal in the decoder 6 and the voice is output from the speaker 7.

Figure 5:
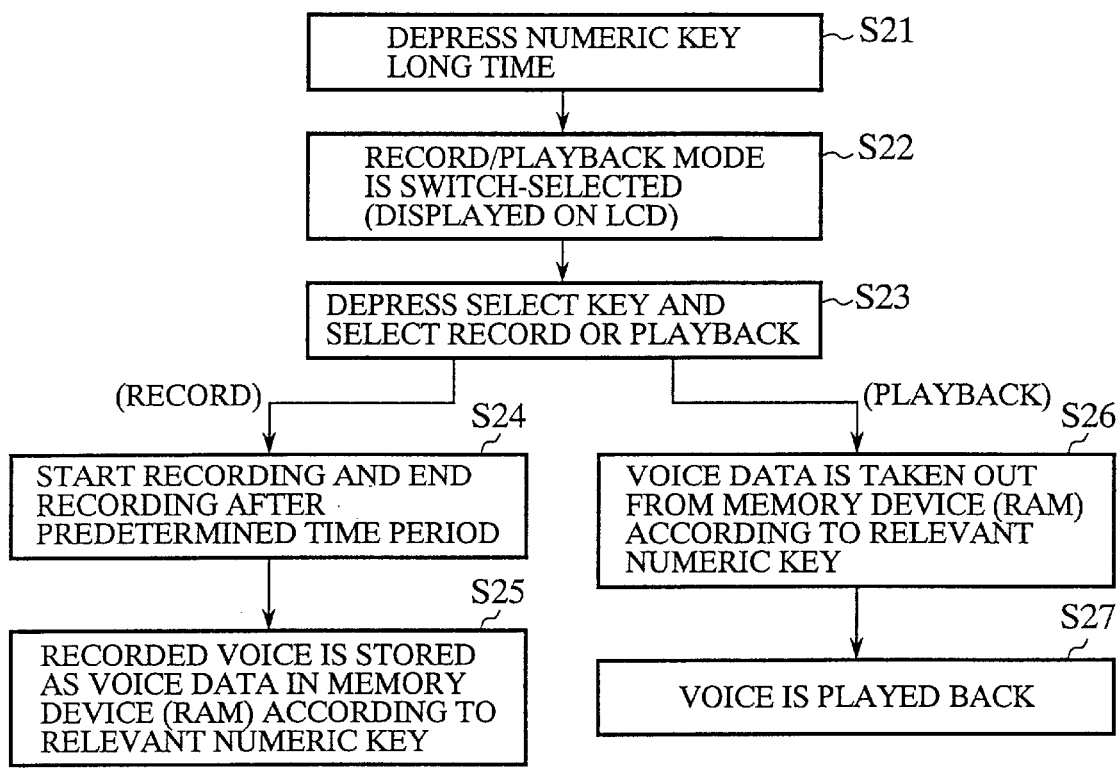
FIG. 5 is a flowchart showing a voice recording/playing back operation in an embodiment 2.

Now, an embodiment 2 will be described with reference to FIG. 5. While a method was described in the embodiment 1 in which each of menu (memory) screens was accessed and voice was recorded by long-time depressing of the function key 10, such operations may be allocated to each of the numeric keys 13. Thus, by depressing the relevant numeric key 13 for a longtime (step S21), the record/playback mode can be switch-selected (step S22).

Figure 6:
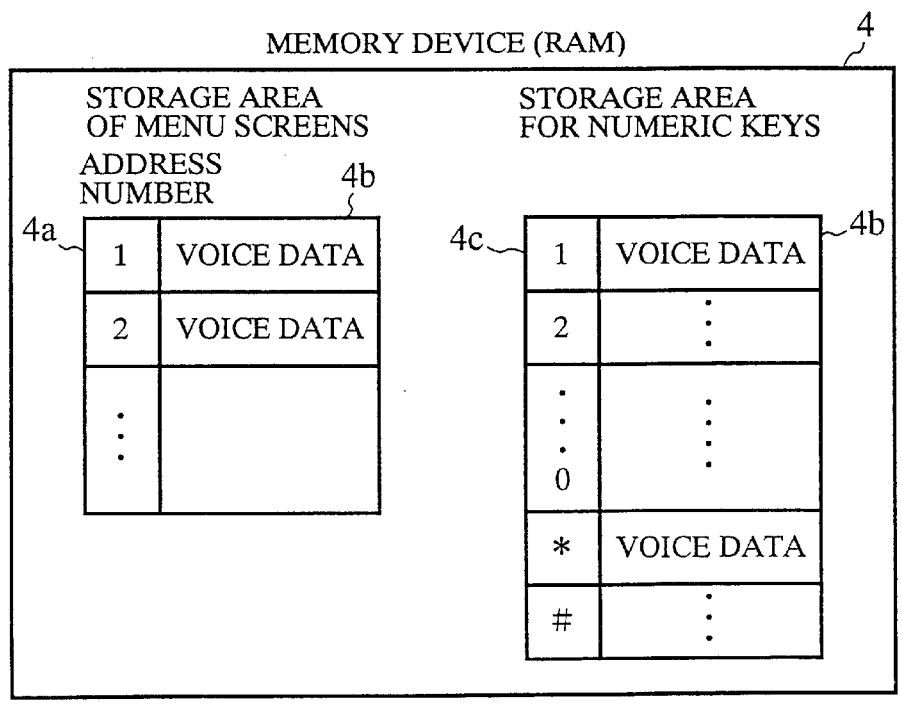
FIG. 6 is a block diagram showing the storage area of a memory device in the embodiment 2.

When recording-voice, the user, after selecting the record mode by using the numeric key 13 and select key 11 (step S23), inputs his or her voice by the microphone 1. Then, the voice data 4*b* is stored in the memory device (RAM) 4, and assigned to the address 4*c* corresponding to the key number as shown in FIG. 6 (steps S24 and S25). When playing back the voice, the user depresses the numeric key 13 for a long time as above and, after the record/playback mode has been selected, switches the mode to the playback mode (step S23). At this time, the voice data 4*b* at the address 4*c* corresponding to the key in question is taken out from the memory device (RAM) 4 (step S26) and, after the data has been converted into an analog signal in the decoder 6, the voice is output from the speaker 7 (step S27).

Figure 7:
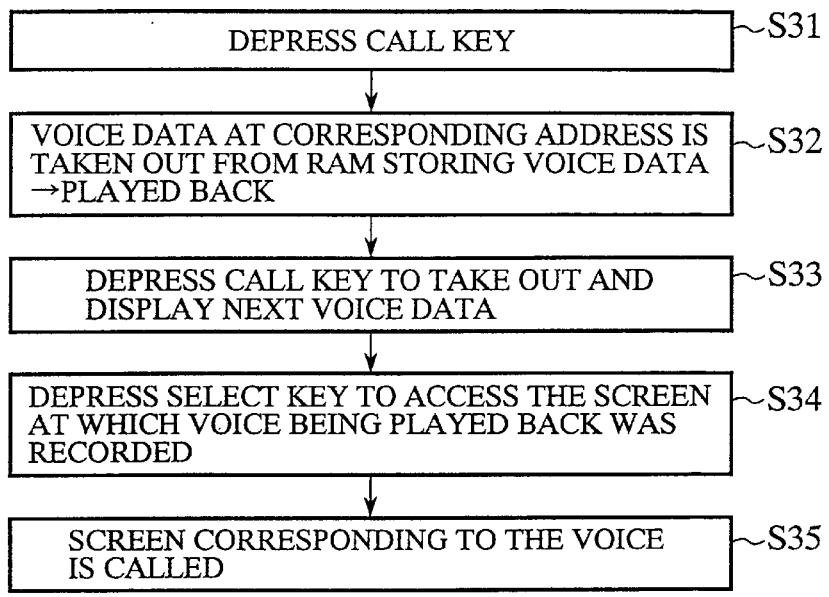
FIG. 7 is a flowchart showing an operating method in an embodiment 3.

Now, an embodiment 3 will be described with reference to FIG. 7. In the case of the embodiment 1, when taking out the voice data 4*b* stored in the memory device (RAM) 4, the voice data 4*b* was taken out by accessing the menu (memory) screens one after the other. However, as shown in FIG. 7, by pushing down a call key 12 (step S31), the addresses at which the voice data are stored are searched, voice data are taken out by ascending order of the addresses at which the voice data are stored, and the data, after being converted into analog signals in the decoder 6, are played back one after the other from the speaker 7 every time the call key 12 is pushed down (steps S32 and S33).

Here, the method whereby the user calls the screen at which the voice, which is being played back, was recorded will be described. When the user depresses the select key when the voice which is being called is played back (step S34), the menu screen is retrieved from another storage area in accordance with the address corresponding to the menu screen at which the voice was recorded and, after retrieval, it is displayed on the display (step S35). Thus, the method is used also as a shortcut function to a menu (memory) screen.

Figure 8:
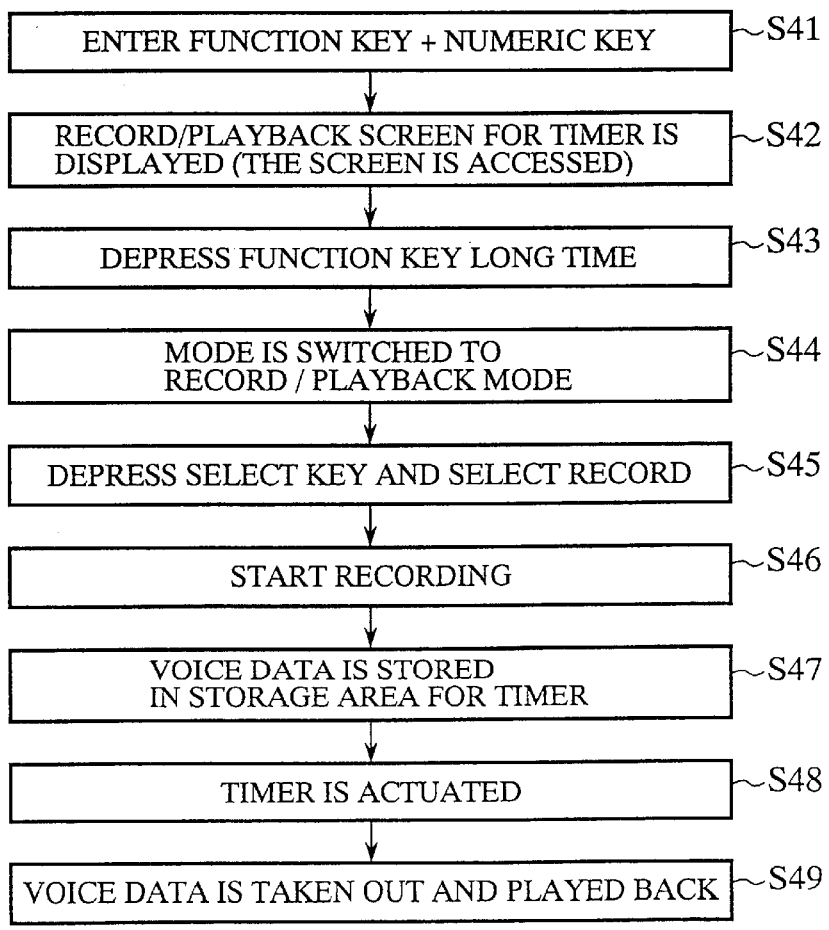
FIG. 8 is a flowchart showing an operating method in an embodiment 4.
Figure 9:
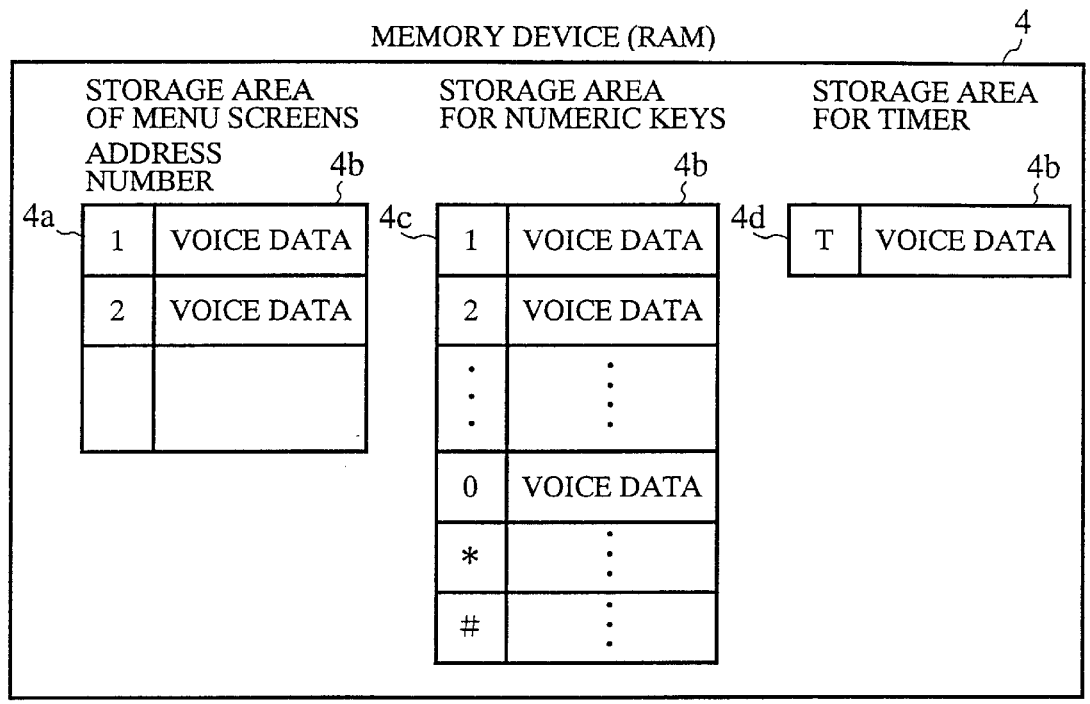
FIG. 9 is a block diagram showing the storage area of a memory device in the embodiment 4.

Further, an embodiment 4 will be described with reference to FIG. 8. In taking out voice data stored in the memory device (RAM) 4, in embodiments 1–3, the playback was achieved by pushing down some keys. However, it may also be achieved by means of a timer function. Namely, as shown in FIG. 8, a preset record/playback screen for a timer is displayed and, upon accessing the screen, voice is recorded (steps S41–S46). The memory device (RAM) 4 has a storage area for timer as shown in FIG. 9, and the voice data 4*b* is stored at a preset address 4*d* for timer (step S47). A period of time is set in the timer functions. When the set period of time has elapsed, the timer is actuated (step S48). Then a check is made as to whether the voice data is stored at the address 4*d* for timer of the storage area for timer in the memory device (RAM) 4. When it is stored therein, the voice is played back from the speaker according to the same method as in the embodiment 1 (step S49).

Further, an embodiment 5 will be described with reference to FIG. 10. In the embodiment 1, a method in which a user's voice is recorded in each menu/memory screen was described. However voice data already recorded in the ROM 3 may be used instead.

Figure 11:
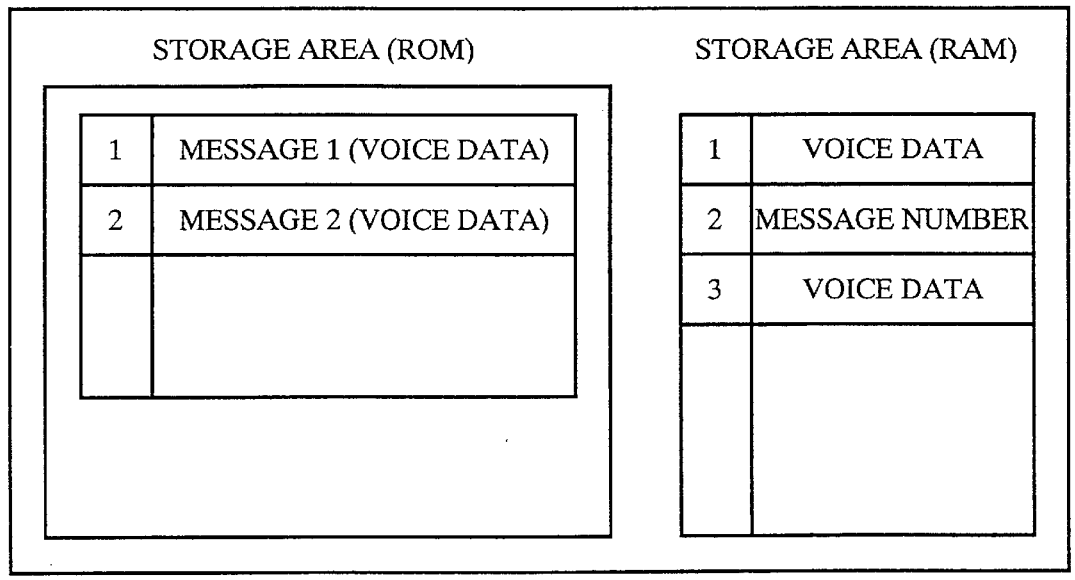
FIG. 11 is a block diagram showing the storage area of a memory device in the embodiment 5.
Figure 10:
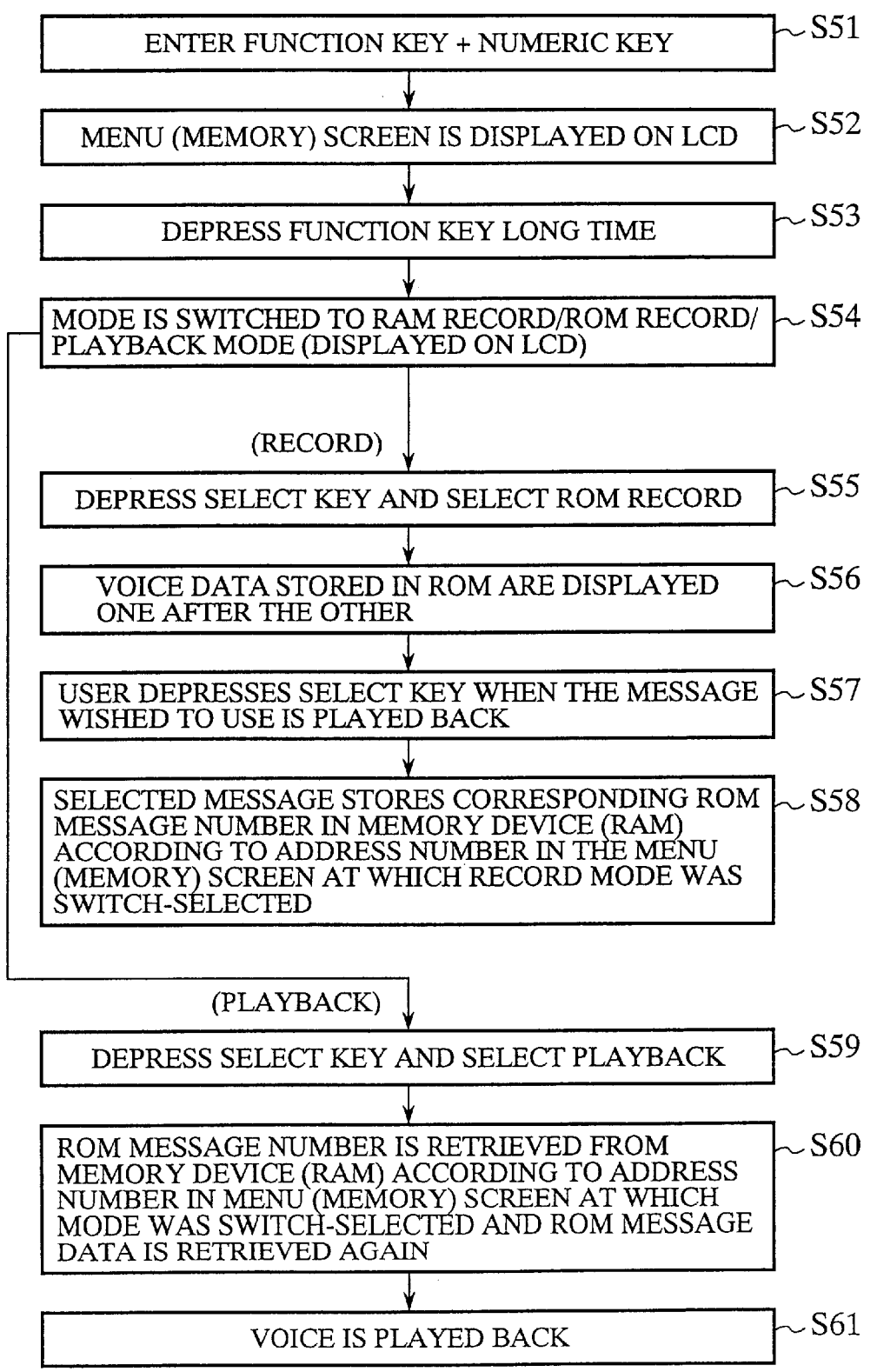
FIG. 10 is a flowchart showing a voice recording/playing back operation in an embodiment 5.

Referring to FIG. 10, steps S51–S53 are the same as steps S1–S3 in the embodiment 1. In step S54, the mode is switched to a record/playback mode and this mode is displayed on the LCD 15. At this point of time, the user makes a setting to select either RAM recording to record his or her voice or ROM recording to utilize a message recorded in the ROM, by using a relevant numeric key 13 and the select key 11. When the use of the voice data stored in the ROM is selected (step S55), the voice data stored in the ROM are played back one after the other (step S56). The user, immediately after the relevant message has been played back, depresses the select key 11 and selects the message (step S57). The selected message causes the corresponding ROM message number to be stored in the memory device (RAM) 4 in accordance with the address number in the menu/memory screen switched to the record mode. FIG. 11 shows the storage area in the memory device, in which the selected message number as above is stored in the memory device at the corresponding address. Then, when playing back the voice, the playback mode is selected at each of the menu (memory) screens (step S59). Then, the voice data is taken out from the ROM in accordance with the ROM message number corresponding to the address stored in the memory device (step S60) and the voice is played back (step S61).

In the portable telephone according to the invention, not only character information displayed on the display, but also guides or information by voice messages, can be obtained. Further, since the user can record any message at will as a voice message, the portable telephone can not only be used for telephoning but also has a potential for various other applications.

INDUSTRIAL APPLICABILITY

The portable telephone according to the invention, as described above, provides guides and information by voice messages at each of the menu screens, and therefore it is fit for use by persons with weak eyesight.

What is claimed is:

1. A portable telephone including a microphone for receiving a sound input and a speaker for delivering a sound output, and a display for displaying a plurality of menu screens, each menu screen having a plurality of selectable functions contained therein, and each menu screen being associated with an address, said portable telephone comprising:

a keypad including a plurality of operation keys;

a memory device for storing sound data corresponding to said sound input to said microphone;

a control portion having a function to record sound data input from said microphone during display of one of said plurality of menu screens, as digital data into said memory device at an address corresponding to the address associated with the menu screen being displayed, and outputting an analog signal converted from said digital data through said speaker upon performing one of subsequent display of said menu screen and operation of a particular key on said keypad.

2. A portable telephone according to claim 1, having a function of recording and playing back an input voice from said microphone in accordance with each numeric key of numeric keys provided in said keypad.

3. A portable telephone according to claim 1, adapted to play back recorded voices one after the other and allow access to a menu screen at which a voice being played back was recorded.

4. A portable telephone according to claim 1, adapted, by the use of a timer function, to play back a recorded voice when a predetermined period of time has elapsed.

5. A portable telephone according to claim 1, adapted to be selectively switched so as to play back either voice data recorded in a ROM in advance or voice data recorded in a RAM.

\* \* \* \* \*

UNITED STATES PATENT AND TRADEMARK OFFICE
CERTIFICATE OF CORRECTION

PATENT NO. : 6,470,076 B1
DATED : October 22, 2002
INVENTOR(S) : Akiko Iwami

It is certified that error appears in the above-identified patent and that said Letters Patent is hereby corrected as shown below:

Column 3,
Line 39, delete "recording-voice" and substitute therefor -- recording voice --.

Column 6,
Line 6, after "and" insert -- subsequent --.

Signed and Sealed this

Eleventh Day of March, 2003

JAMES E. ROGAN
*Director of the United States Patent and Trademark Office*